United States Patent
Ali et al.

(10) Patent No.: US 10,368,384 B2
(45) Date of Patent: Jul. 30, 2019

(54) ASYMMETRIC CAPABILITY COORDINATION IN DUAL CONNECTIVITY

(71) Applicant: Nokia Technologies Oy, Espoo (FI)

(72) Inventors: Amaanat Ali, Espoo (FI); Tero Henttonen, Espoo (FI)

(73) Assignee: Nokia Technologies Oy, Espoo (FI)

(*) Notice: Subject to any disclaimer, the term of this patent is extended or adjusted under 35 U.S.C. 154(b) by 94 days.

(21) Appl. No.: 15/672,546

(22) Filed: Aug. 9, 2017

(65) Prior Publication Data

US 2019/0053292 A1  Feb. 14, 2019

(51) Int. Cl.
*H04W 4/00*  (2018.01)
*H04W 76/16*  (2018.01)
*H04L 5/00*  (2006.01)
*H04W 88/06*  (2009.01)
*H04W 72/04*  (2009.01)

(52) U.S. Cl.
CPC ......... *H04W 76/16* (2018.02); *H04L 5/0032* (2013.01); *H04L 5/0055* (2013.01); *H04W 88/06* (2013.01); *H04W 72/0426* (2013.01)

(58) Field of Classification Search
CPC .. H04W 76/16; H04W 72/042; H04L 5/0032; H04L 5/0055
USPC ......................................................... 370/329
See application file for complete search history.

(56) References Cited

U.S. PATENT DOCUMENTS

| | | | | |
|---|---|---|---|---|
| 2012/0020346 A1* | 1/2012 | Ganapathy | ........ | H04W 36/0033 370/338 |
| 2013/0322370 A1* | 12/2013 | Fong | ................... | H04W 72/048 370/329 |
| 2016/0081020 A1* | 3/2016 | Rahman | ............ | H04W 52/0209 370/311 |
| 2016/0212790 A1* | 7/2016 | Fujishiro | ................. | H04L 45/24 |
| 2016/0338109 A1* | 11/2016 | Rahman | ............ | H04W 74/0833 |
| 2017/0303286 A1* | 10/2017 | Sang | ...................... | H04W 76/15 |
| 2018/0227960 A1* | 8/2018 | Belghoul | .......... | H04W 36/0022 |
| 2018/0279230 A1* | 9/2018 | Yi | ........................ | H04W 52/146 |

(Continued)

OTHER PUBLICATIONS

3GPP TSG-RAN WG2 Meeting #97bis R2-1704129, "LTE/NR capabilites dependenciesQualcomm Incorporated", 10.2.6, Spokane, USA, Apr. 3-7, 2017, (6 pages).

(Continued)

*Primary Examiner* — Charles T Shedrick
(74) *Attorney, Agent, or Firm* — Harrington & Smith

(57) ABSTRACT

For dual connectivity with a UE where a master radio access node communicates using one of an older or newer radio access technology (RAT) and a secondary radio access node communicates using the other of the older or newer RAT, the master node a) sends to the secondary node an addition request message comprising configuration information enabling the secondary node to operate with the master node for dual connectivity with a user equipment (UE); b) receives from the secondary node in reply a request acknowledgement message acknowledging participation by the secondary node in the dual connectivity; and thereafter c) participates in the dual connectivity when communicating wirelessly with the UE. The addition request and request acknowledgement messages are in accordance with RRC signaling of the older RAT regardless which of the older and the newer RAT the master node uses when participating in the dual connectivity.

26 Claims, 7 Drawing Sheets

(56) References Cited

U.S. PATENT DOCUMENTS

2018/0324899 A1\* 11/2018 Sivavakeesar ........ H04W 76/16
2018/0368191 A1\* 12/2018 Vutukuri ................ H04W 4/70

OTHER PUBLICATIONS

3GPP TSG-RAN WG2 NR Adhoc #2 R2-1706859, "UE capability structure and coordination aspects for MR-DC", 10.2.6.2, Nokia, Alcatel-Lucent Shanghai Bell , Qingdao, China, Jun. 27-29, 2017, (14 pages).

\* cited by examiner

402: master radio access node 20 sends to a secondary radio access node 22 an addition request message 1 comprising configuration information (SN-ConfigInfo) enabling the secondary radio access node to operate with the master node for dual connectivity with a UE

404: master radio access node receives from the secondary radio access node, in reply to the addition request message 1, a request acknowledgement message 2 acknowledging participation by the secondary radio access node in the dual connectivity

- the dual connectivity comprises the master radio access node communicating wirelessly with the UE using one of an older or a newer radio access technology (RAT) and the secondary radio access node communicating wirelessly with the UE using the other of the older or the newer RAT; and

- the addition request message 1 and the request acknowledgement message 2 are in accordance with radio resource control signaling of the older RAT regardless which of the older and the newer RAT the master radio access node uses for the communicating

406: the master radio access node participates in the dual connectivity when communicating wirelessly with the UE

FIG. 4

502: secondary radio access node receives from a master radio access node an addition request message 1 comprising configuration information (SN-ConfigInfo) enabling the secondary node to operate with the master node for dual connectivity with a UE

504: secondary radio access node sends to the master radio access node, in reply to the addition request message 1, a request acknowledgement message 2 acknowledging participation by the secondary radio access node in the dual connectivity

- the dual connectivity comprises the master radio access node communicating wirelessly with the UE using one of an older or a newer radio access technology (RAT) and the secondary radio access node communicating wirelessly with the UE using the other of the older or the newer RAT; and

- the addition request message and the request acknowledgement message are in accordance with radio resource control signaling of the older RAT regardless which of the older and the newer RAT the secondary radio access node uses for the communicating

506: secondary radio access node establishes an active communication link with the UE for the dual connectivity

FIG. 5

ASYMMETRIC CAPABILITY COORDINATION IN DUAL CONNECTIVITY

TECHNOLOGICAL FIELD

The described invention relates to wireless communications, and more particularly to coordination for providing dual connectivity to a user equipment (UE) where two different radio access nodes operate with two different radio access technologies (RATs).

BACKGROUND

Acronyms used herein are listed below following the detailed description. Dual connectivity is known in the wireless arts; for example a cellular base station and a WiFi access point may cooperate when providing wireless service to a UE where the cellular base station utilizes a cellular RAT for its portion of the dual connectivity and the WiFi access point utilizes an IEEE 802.xx RAT for its portion of the dual connectivity. Another example is the baseline dual connectivity described in 3GPP TS 36.300 which provides an aggregation of radio resources across two LTE eNBs. The 3GPP organization is developing a new radio access technology (NR for new radio, or sometimes referred to as 5G) that may eventually replace E-UTRAN (also known as LTE or 4G). The radio access nodes for NR are referred to a gNBs, and it is anticipated that early deployments of gNBs will not be within a standalone 5G system but will operate by sharing some of the existing LTE infrastructure such as core network operations and gateway servicing.

To bridge the gap in time until the NR infrastructure is more fully deployed, it is desirable to provide dual connectivity to UEs where the LTE radio access node eNB will be communicating with the UE using the LTE RAT and the gNB will be communicating with the UE using the NR RAT. One key principle adopted in standardizing this EUTRAN-NR Dual Connectivity (EN-DC) is that the LTE and NR nodes should act as independently as possible, meaning each node can provide and manage its own radio resources in EN-DC operation without having to comprehend what the other node is doing. An example of comprehension/understanding relates to the aspect of having one node to interpret either the other node UE radio capabilities or the radio resource configuration provided by the other node. One purpose of this is to retain separation so the development of NR can evolve independently of LTE such that the LTE node does not need to be upgraded upon every NR upgrade; another important purpose is to allow easy interoperability between nodes made by different vendors/manufacturers by ensuring each node is as independent as possible.

In this regard the different radio access nodes need to have some degree of coordination regarding the UE capabilities to ensure both nodes respect the overall UE configuration limitations so that the total UE capabilities are neither individually nor jointly exceeded, some of which may be at least partially dependent on what is configured for the other radio access system. 3GPP document R2-1706859 by Nokia, Alcatel-Lucent and Shanghai Bell [3GPP TSG-RAN WG2 NR Adhoc #2; *UE capability structure and coordination aspects for MR-DC*; Qingdao, China; 27-29 Jun. 2017] broadly categorizes UE capabilities into sub-groups: radiofrequency (RF) capabilities (band combinations and capabilities that are per band combination); physical (PHY) capabilities (receiver, MIMO and TM capabilities, feedback, codebooks etc.); protocol-specific capabilities (MAC/RLC/PDCP based capabilities), measurement specific capabilities; feature specific capabilities; UE category indication; and inter-RAT capabilities (e.g. frequency bands supported by inter-RAT). How to implement this capability coordination has not yet been resolved in 3GPP. The quandary is that if each node would completely understand its own limitations it would not need to understand the other node's limitations, and could therefore do independent configuration. But for the case of inter-RAT DC there will still need to be some coordination in at least some cases so each node has to at least comprehend which capabilities would require some coordination. It is not desirable to adopt the LTE dual connectivity-based solution (such as the LTE-DC and LTE-WiFi example above) where the capabilities and configuration of each node are fully comprehended by the other, for this would undermine the independence of the NR system from the LTE system.

Document R2-1706859 referenced above provides one approach that supports that can be summarized as an 'index-based' capability coordination that might preserve this inter-RAT independence. 3GPP document R2-1704129 by Qualcomm [3GPP TSG-RAN WG2 Meeting #97bis; *LTE/NR capabilities dependencies*; Spokane, USA; 3-7 Apr. 2017] describe a similar approach.

Embodiments of these teachings aim to ensure that, in the context of inter-RAT dual connectivity, the capability coordination between LTE and NR minimizes the need for comprehension of the other RAT capability and configuration details.

SUMMARY

According to a first aspect of these teachings there is a method comprising: sending from a master radio access node to a secondary radio access node an addition request message comprising configuration information enabling the secondary radio access node to operate with the master node for dual connectivity with a user equipment (UE); receiving at the master radio access node from the secondary radio access node, in reply to the addition request message, a request acknowledgement message acknowledging participation by the secondary radio access node in the dual connectivity; and thereafter the master radio access node participating in the dual connectivity when communicating wirelessly with the UE. In particular for this first aspect, a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control signaling of the older RAT regardless which of the older and the newer RAT the master radio access node uses for the communicating.

According to a second aspect there is an apparatus comprising: at least one processor; and at least one memory storing computer readable instructions that when executed by the at least one processor cause the apparatus to perform actions comprising: sending from a master radio access node to a secondary radio access node an addition request message comprising configuration information enabling the secondary radio access node to operate with the master node for dual connectivity with a user equipment (UE); receiving at the master radio access node from the secondary radio access node, in reply to the addition request message, a request acknowledgement message acknowledging participation by the secondary radio access node in the dual connectivity; and thereafter the master radio access node participating in the dual connectivity when communicating wirelessly with the UE. In this second aspect a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control signaling of the older RAT regardless which of the older and the newer RAT the master radio access node uses for the communicating. In a particular embodiment such an apparatus is the master radio access node or a portion of the master radio access node.

According to a third aspect of these teachings there is a method comprising: receiving at a secondary radio access node from a master radio access node an addition request message comprising configuration information enabling the secondary node to operate with the master node for dual connectivity with a user equipment (UE); sending from the secondary radio access node to the master radio access node, in reply to the addition request message, a request acknowledgement message acknowledging participation by the secondary radio access node in the dual connectivity; and thereafter the secondary radio access node establishing an active communication link with the UE for the dual connectivity. In particular for this third aspect, a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control signaling of the older RAT regardless which of the older and the newer RAT the secondary radio access node uses for the communicating.

According to a fourth aspect there is an apparatus comprising: at least one processor; and at least one memory storing computer readable instructions that when executed by the at least one processor cause the apparatus to perform actions comprising: receiving at a secondary radio access node from a master radio access node an addition request message comprising configuration information enabling the secondary node to operate with the master node for dual connectivity with a user equipment (UE); sending from the secondary radio access node to the master radio access node, in reply to the addition request message, a request acknowledgement message acknowledging participation by the secondary radio access node in the dual connectivity; and thereafter the secondary radio access node establishing an active communication link with the UE for the dual connectivity. In this fourth aspect a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control signaling of the older RAT regardless which of the older and the newer RAT the secondary radio access node uses for the communicating. In a particular embodiment such an apparatus is the secondary radio access node or a portion of the secondary radio access node.

These and other aspects of these teachings are detailed below with particularity.

BRIEF DESCRIPTION OF THE DRAWINGS

FIG. 4 is a process flow diagram summarizing certain of the teachings herein from the perspective of the master radio access node.

FIG. 5 is a process flow diagram summarizing certain of the teachings herein from the perspective of the secondary radio access node

DETAILED DESCRIPTION

Figure 1:
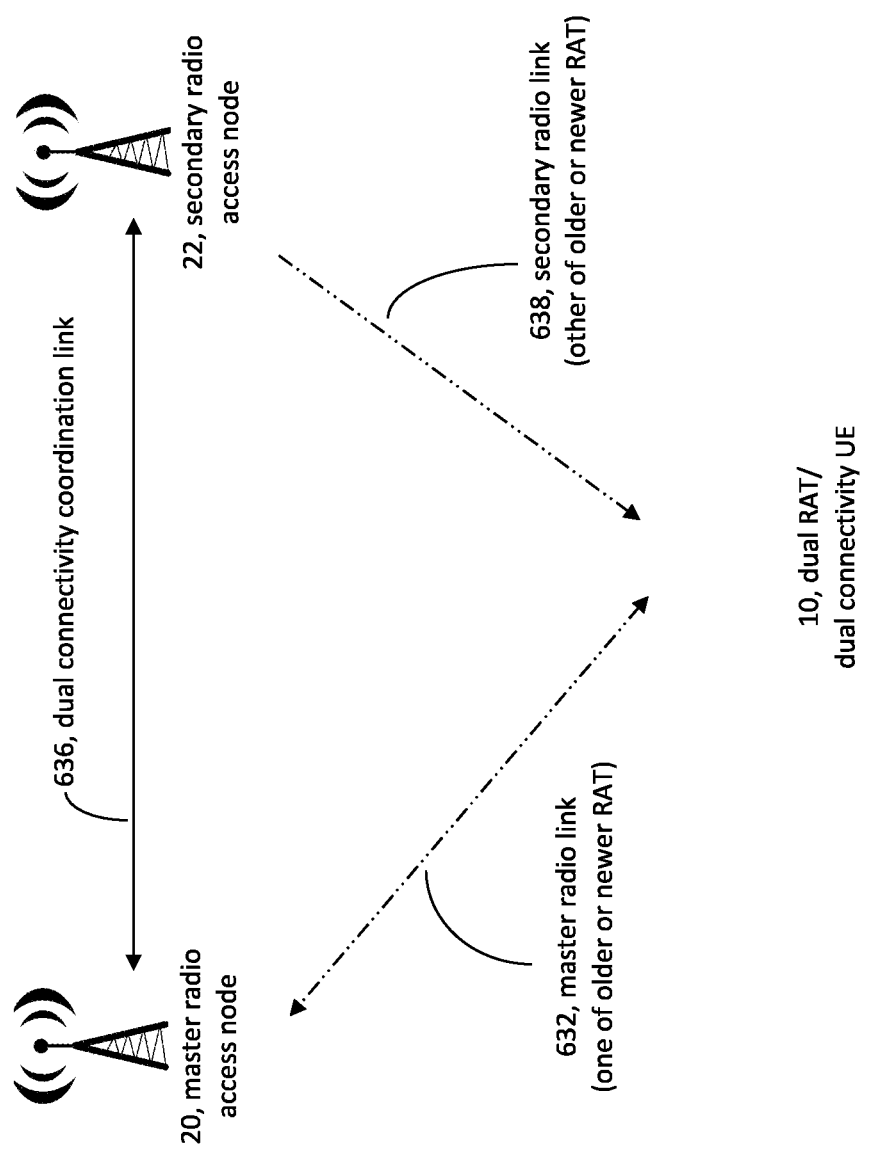
FIG. 1 is a schematic diagram illustrating an example multi-RAT dual connectivity radio environment in which embodiments of these teachings may be practiced.

FIG. 1 is a schematic overview of an example radio environment in which embodiments of these teachings may be practiced to advantage. The UE 10 has radios for simultaneously communicating with a master radio access node 20 over a master radio link 632 using a first RAT, and with a secondary radio access node 22 over a secondary radio link 638 using a different second RAT. More specifically the different RATs may be considered an older RAT such as LTE and a newer RAT such as NR/5G; different versions of the same RAT such as different versions of LTE are by definition not different RATs. There is also shown at FIG. 1 a dual connectivity coordination link 636 between the radio access nodes 20, 22 over which they may perform the coordination described herein. The master radio access node 20 is the UE's serving node while the secondary radio access node 22 is not; in the examples below the secondary radio access node 22 is being added to the cells with which the UE has an active connection specifically for multi-RAT dual connectivity. The UE may have active connections with multiple cells under the master radio access node's group and may establish active connections with multiple cells under the secondary radio access node's group but for simplicity the examples herein assume the UE has an active connection with only one cell in the master group (the master radio access node 20) and establishes another active connection with only one cell in the secondary group (the secondary radio access node 22). In the early deployments of gNBs for the NR/5G system it is anticipated both the master 20 and secondary 22 nodes of FIG. 1 would interface to the same evolved packet core (EPC) of LTE for core network operations; alternatively they may both be connected to the same core network that is operating according to NR/5G technology (termed NexGen core by the 3GPP) once that gateway/core network infrastructure is deployed and operational.

It is expected that there will be some shared resources (hardware) in the UE 10 to perform this dual connectivity, such as for example buffer memory, processor capacity, pre-amplifiers and power amplifiers, or even antennas. These shared resources may be hard or semi-statically split among the two different RATs, and in this case the index based solution would work fairly well. But that index-based solution is less effective when the sharing of UE resources is very flexible, as may be expected for future UE architectures with LTE/NR dual connectivity situations. The sharing of these UE resources for LTE-NR dual connectivity may be dependent on layer 1 and/or layer 2 restrictions imposed by the LTE and by the NR nodes 20, 22; by LTE and NR band combinations; and the like where the capabilities of the UE for use in the LTE RAT are joint with its capabilities for use in the NR/5G RAT.

As mentioned in the background section, extending the conventional LTE-dual connectivity model for use with LTE-NR/5G dual connectivity would have both the LTE node and the NR/5G node sharing a common multi-RAT dual connectivity capability and both nodes would be expected to understand the configuration being sent from other node and prepare its own configuration in return. This requires each node to manually interpret the coordination messages it gets from the other-RAT node in order to understand that other-RAT node's capabilities and configuration. If the common part were reasonably small and well specified this approach might be sufficient, but still this would not address the risk for inoperability when the nodes are from different vendors and cannot inter-operate.

Embodiments of these teachings provide a different type of mechanism wherein the capability coordination is done in an asymmetric way. More specifically, only one node comprehends the other-node's capabilities and configuration. Each node comprehends its own RRC protocol according to a certain Access Stratum (AS) release version, which refers to the RRC protocol version that is defined by the corresponding 3GPP RRC document version. Both the LTE and NR RRC use the Abstract Syntax Notation One (ASN.1) as the signalling protocol, which allows having backward-compatibility for protocol: That is, a node comprehending version X+1 of the RRC protocol always also comprehends the version X of the RRC protocol, i.e. the RRC protocol is defined in a backward-compatible manner. Within the UE capabilities, the UE always indicates the protocol version that it supports, so that the network can use that information when deciding the actual RRC configuration for the UE. As detailed further in an example below where the eNB operating with LTE is the master node 20, the coordination messages are according to the LTE RRC protocol format, which means they are defined within the LTE RRC specification. So while the gNB operating with NR/5G as the secondary node 22 will need to comprehend the part of NR RRC protocol that contains the NR/5G RAT capabilities, it will also need to understand the parts of the LTE RRC protocol that contain the UE capabilities and coordination messages that the secondary node 22 gets from the master node/eNB 20, whereas the eNB 20 will be able to understand the format of the capabilities exchanged in dual connectivity messages that are exchanged between them since they are already defined in the LTE RRC protocol. This will then remain true if at some later time or with some different dual connectivity UE the roles are reversed such that the gNB is in the position of the master node 20 while the eNB is in the position of the secondary node 22; still the dual connectivity coordination messages exchanged between them will be according to the LTE RAT.

Additionally, in some deployments the originating (master) node 20 may also include the RRC "version number" (e.g. RRC AS-Release indication that is utilized by the node) to aid in resolving how to understand the capability coordination and how to setup the final UE configuration. For example, the master node and secondary node may comprehend different versions of the same protocol, so setting the used RRC protocol version number can help the nodes to coordinate the configuration in a manner that both comprehend. In another embodiment the RRC "version number" may be used to implicitly define which node 20, 22 performs the interpretation. In a yet further embodiment the same may be left to inter-node coordination without depending on the RRC "version number".

In accordance with certain embodiments of these teachings:

A. The entity handling the NR/5G capabilities (the gNB) "imports" the definitions of the LTE capabilities; that is, it comprehends at least a part of a certain release of LTE RRC protocol definitions.
B. The NR/5G standalone capabilities are linked to the imported LTE capability definitions with multi-RAT dual connectivity capability signaling extensions.
C. Multi-RAT dual connectivity related capability signaling extensions are made to the NR/5G standalone capability.
D. The NR/5G adapts to the LTE radio resource control (RRC) on the inter-node interface 636 (which may be termed an X2 or Xn interface) in both directions, potentially via indications of supported RRC AS-release of the configuration that is used or proposed by the node sending the message.

For LTE-NR/5G dual connectivity where the nodes 20, 22 are connected to a LTE core network, as well as for the case these nodes 20, 22 are connected to a NexGen NR/5G core, this means that secondary node 22 operating with NR/5G comprehends the LTE master node 20 capabilities and configuration, but the LTE master node 20 does not (fully) comprehend the NR/5G secondary node 22 configuration and capabilities. Since in this example the LTE master node 20 is the one initiating the configuration, it can indicate the AS-release of the RRC configuration to the NR/5G secondary node 22 to aid it in decoding of the LTE master node's RRC configuration and capabilities, and to help resolve any configuration dependencies. The secondary node 22 may also request the master node 20 to change the configuration, or to indicate a "reference configuration" that tells to the master node 20 how the secondary node 22 configuration has been derived.

In the reverse case where the master node 20 is the NR/5G node (gNB) and the secondary node 22 is the LTE node (eNB), this means that the NR/5G master node 20 comprehends the LTE secondary node 22 configuration but not vice versa. Since the NR master node 20 in this case initiates the configuration, it will anyway have the full UE capabilities, and can therefore simply indicate the master node 20 configuration to the LTE secondary node 22 along with a reference secondary node configuration containing the capability restrictions, based on which the secondary node 22 then simply chooses the available configuration parameters.

Figure 2A:
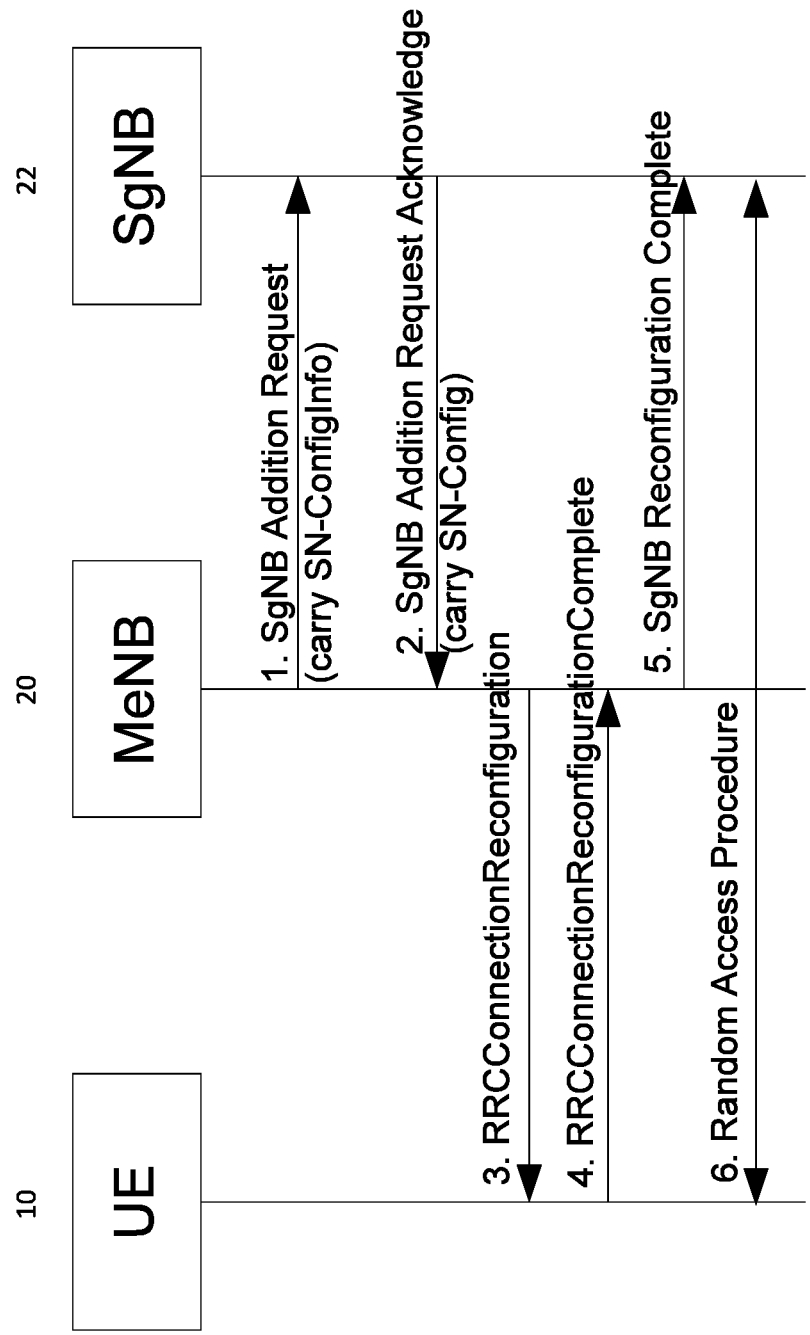
FIG. 2A is a signalling diagram illustrating messages that may be communicated when a secondary radio access node SgNB that is operating with a given UE using NR/5G is added/configured for multi-RAT dual connectivity, according to an example embodiment of these teachings.

FIG. 2A is a signalling diagram illustrating messages that may be communicated when a secondary node (SgNB 22) that is operating with a given UE using NR/5G is added/configured for multi-RAT dual connectivity. The master node is an eNB (MeNB 20) operating with that UE using LTE. Message 1 from the MeNB 20 to the SgNB 22 is an addition request message that includes configuration information (SN-Config_Info) enabling the secondary node SgNB 22 to operate with the master node MeNB 20 for dual connectivity with a user equipment (UE) 10. In reply to the addition request message the SgNB 22 sends to the MeNB 20 message 2 which is an addition request acknowledgement message acknowledging participation by the SgNB 22 in the dual connectivity. As shown in FIG. 2A this message 2 may carry the configuration (SN-Config) of the SgNB 22. Now the MeNB 20 can signal the UE 10 to reconfigure for dual connectivity at message 3 (RRC_Connection_Reconfiguration message) to which the UE 10 replies after re-configuring with message 4 (RRC_Connection_Reconfiguration_Complete message). Message 5 is the MeNB 20 passing along to the SgNB 22 that the reconfiguration of the SgNB 22 is now complete at which time the SgNB 22 is available to establish a RRC connection with the UE (such as via a random access procedure shown in FIG. 2A as message exchange 6) so as to result in the multi-RAT dual connectivity shown at FIG. 1. Note that the names used herein for the messages at FIG. 2, particularly for messages 1 and 2, may differ from the actual names that may eventually be adopted by the LTE and NR/5G radio access procedures that may implement these teachings.

Figure 2B:
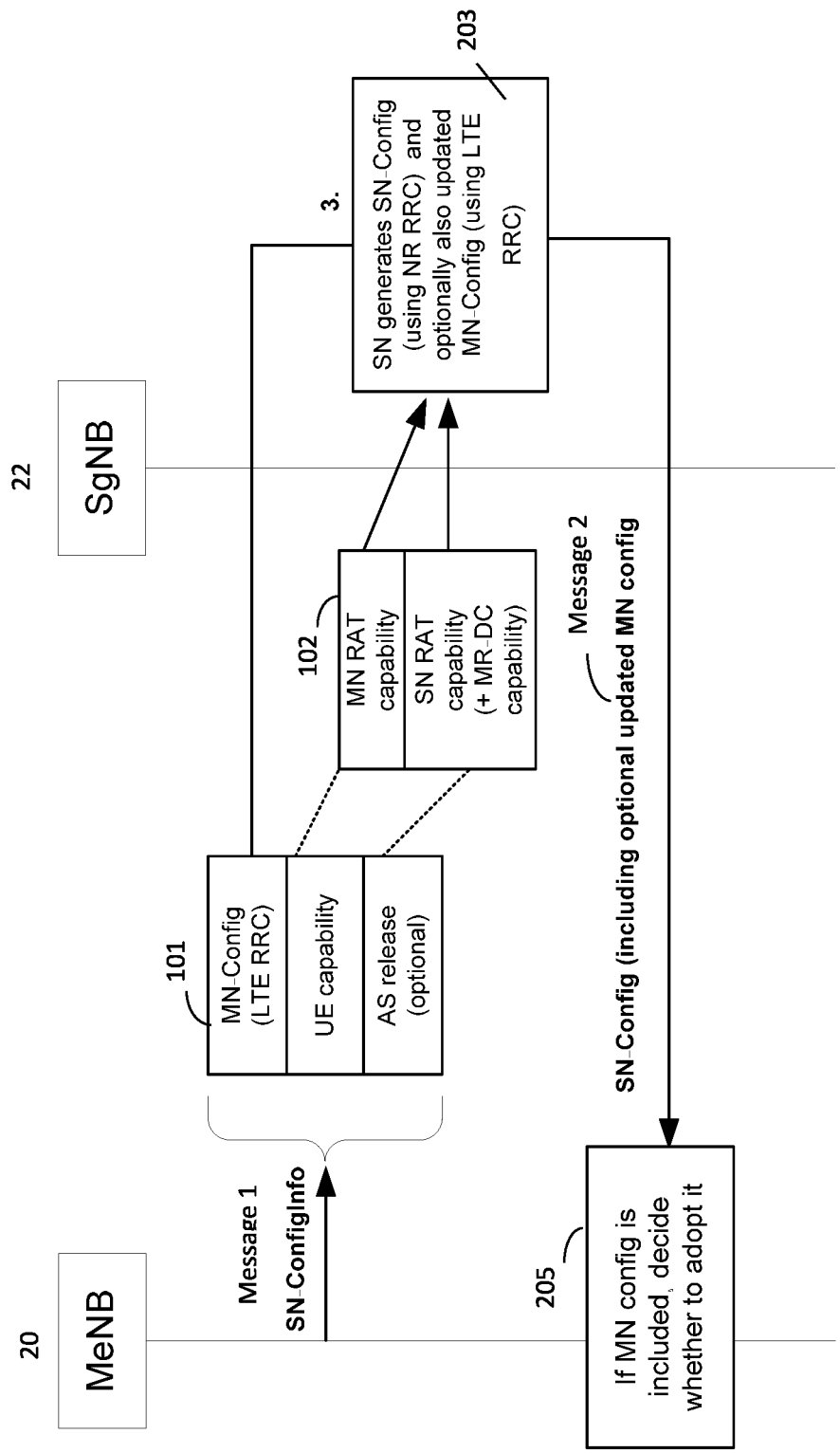
FIG. 2B shows further detail of the messages 1 and 2 of FIG. 2A as well as decisions at the SgNB 22 and the master radio access node MeNB 20, according to an example embodiment of these teachings.

FIG. 2B shows further detail of the messages 1 and 2 of FIG. 2A as well as decisions at the SgNB 22 and the MeNB 20. The information in message 2 that enables the secondary node SgNB 22 to operate with the master node MeNB 20 for dual connectivity with a user equipment (UE) 10 includes 101 the master node configuration and the UE capability information (and optionally the RRC AS-release number). More specifically, the MN configuration includes the RAT capability of the MeNB 20 and the UE capability information includes the RAT on which the SgNB 22 should operate which is taken from the multi-RAT dual connectivity capabilities of the UE 10, as FIG. 2B shows at block 102. Decision block 203 has the SgNB 22 generating its own secondary node (SN) configuration given the restrictions within the information at block 102, and this may in some instances include the SgNB 22 providing an updated or changed master node (MN) configuration. The SgNB 22 sends message 2 to the MeNB 20, and if it includes the updated or changed MN configuration then at block 205 the MeNB 20 decides whether or not to adopt it.

More specifically, the MeNB 20 transfers the SN-ConfigInfo via message 1 to the SgNB 22. The SN-ConfigInfo contains the master cell group (MCG) configuration and the full UE capability container, which includes the UE capabilities for at least LTE and NR/5G RATs. The RRC AS-release version number may also be contained within the message 1. The SgNB 22 interprets the MCG configuration and the LTE UE capabilities received from the MeNB 20; both of these are encoded with LTE RRC protocol, so this implies the NR SgNB 22 is able to comprehend the LTE RRC. Because the secondary node (SN) by default comprehends the received UE capabilities for the NR SgNB 22, it can then resolve the joint multi-RAT dual connectivity capabilities and at block 203 generate the secondary cell group (SCG) Configuration for the UE 10, to be sent within the SN-Config of message 2. In addition, the SgNB 22 can also ask the (LTE) MeNB 20 to perform a reconfiguration of the MCG configuration by indicating in message 2 the "delta" configuration and AS-release via which it was created. If the MeNB 20 receives in message 2 the MN-Config generated by the SgNB 22, the MeNB 20 can decide at block 205 whether to adopt it for the UE 10.

Figure 3:
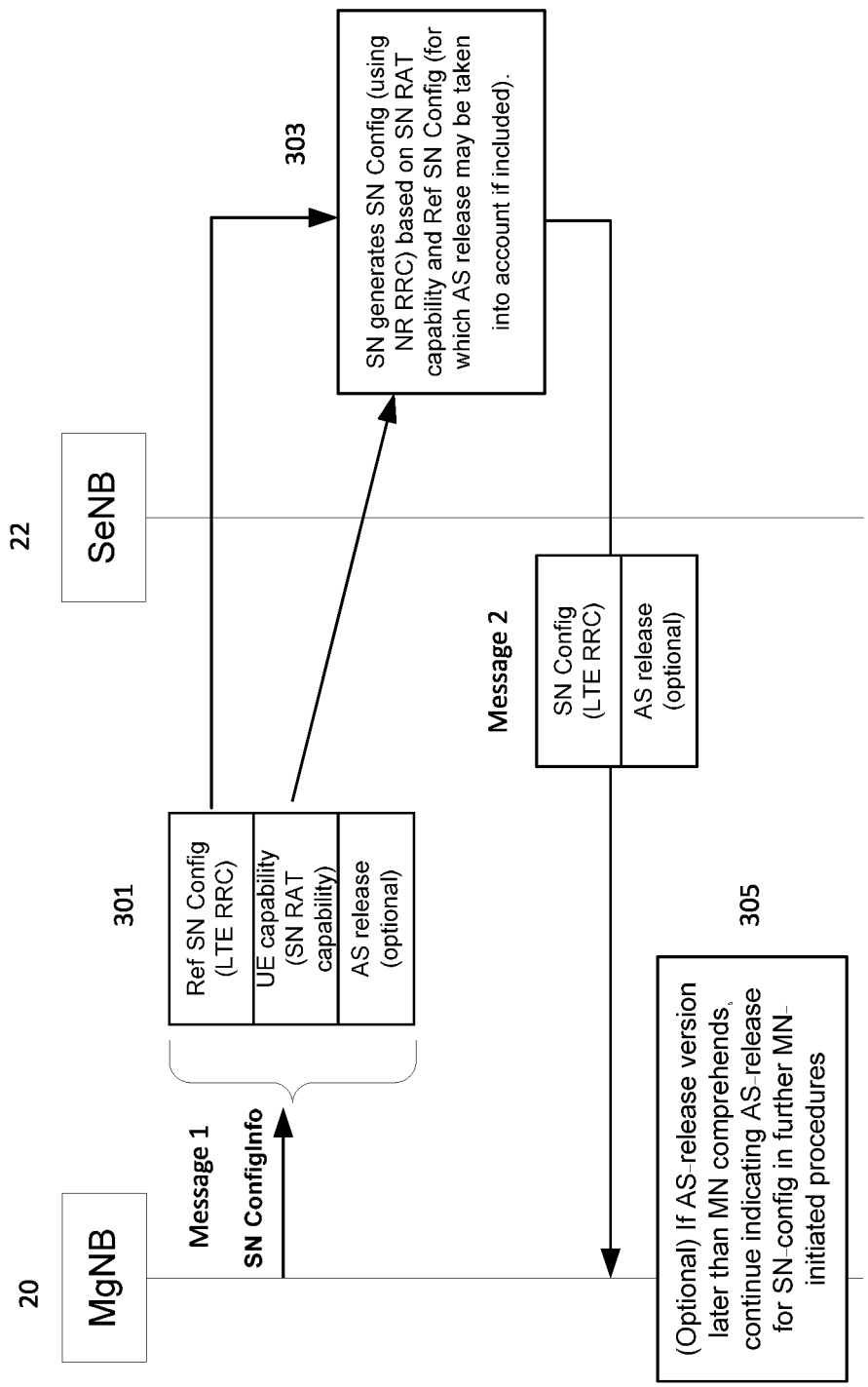
FIG. 3 is similar to FIG. 2A but for the case in which the gNB is the master radio access node and the eNB is the secondary radio access node, according to an example embodiment of these teachings.

The signalling diagrams of FIGS. 2A-2B assume the eNB is the master node and the gNB is the secondary node, meaning the core network they share is (most likely in initial deployments) EPC. In this case the secondary node SgNB 22 implements the NR/5G radio resource control with the UE when participating in the dual connectivity. FIG. 3 illustrates similar to FIG. 2A but for the case in which the gNB is the master node 20 and the eNB is the secondary node 22, meaning the core network they share is most likely NR/5G (NexGen core).

Specifically, at FIG. 3 the gNB 20 is master which initiates the multi-RAT dual connectivity so its own NR/5G RRC sends the SN-Config_Info of message 1 to the secondary node 22. Due to the fact that the secondary node is an eNB it directly receives its configuration guidance from the MgNB 20 to generate the SN-Config that it replies in message 2. The MgNB 20 decides on the MCG configuration based on the NR/5G master node provided SN-Config_Info) and the secondary node 22 (LTE) capabilities of the UE. Since the MgNB 20 can comprehend them both, the MgNB 20 indicates the reference secondary node configuration (Ref-SN-Config) to the SeNB 22 in message 1 at block 301 as well as the UE capability limitations. This message 1 may also indicate the RRC AS-release with which the configuration was generated to ensure compatibility with the secondary node configuration, also as shown at block 301.

The SeNB 22 receives the MCG configuration and the reference secondary node configuration and based on that information decides at block 303 on the final SeNB configuration (SN-Config). The SeNB 22 indicates the final SN-Config to the MgNB 20 at message 2, and at this time the MgNB 20 can send it to the UE 10 such as via the RRC_Connection_Reconfiguration message 4 shown at FIG. 2A. Message 2 from the SeNB 22 may also indicate the RRC AS-release with which the secondary node configuration was generated, so as to ensure compatibility with the MgNB 20 configuration. If the RRC AS-release is indicated and later comprehended by the MgNB 20, the RRC AS-release may be indicated again in further master node-initiated procedures to ensure compatibility with the SN configurations.

The above examples show that to allow DC between LTE and NR, only the NR/5G radio resource control (RRC) needs to be built to understand the LTE RRC but not vice-versa. This simplifies the implementation of LTE-NR/5G dual connectivity, and ensures legacy LTE eNBs do not need to be updated with advances in NR/5G gNBs.

One technical effect of embodiments of these teachings is that the full comprehension of the other-RAT node's capabilities is built only into the NR/5G RRC, as opposed to extending the LTE-style dual connectivity regime such that both different-RAT nodes would need to fully understand each other's capabilities. Because in the above examples only the NR/5G RRC needs to understand LTE RRC (and not vice-versa), one way to implement these teachings is to utilize new signalling extensions as described above. For embodiments in which the version number is signalled a further technical effect is that this feature ensures that both different-RAT nodes are able to know whether the same RRC release is used, and whether tight coordination is required at each reconfiguration. For example, if both different-RAT nodes do not comprehend the same version of RRC, the lowest version configuration would typically be used. In practice it is anticipated that already-deployed LTE eNBs will not be upgraded beyond a certain while the NR/5G RRC is the newer RAT specification and will continue in the long-term future, and so the solution presented herein does not require the LTE RRC to be upgraded to work in a full comprehension of the NR/5G RRC.

A further technical effect of embodiments of these teachings is that they solve the issue of capability coordination in an asymmetric manner so that the newer system (NR/5G in the above examples) can comprehend the older one (LTE in the above examples), but not vice versa since the newer system is more likely to be updated than the older system. Finally, embodiments in which the RRC AS release is indicated in the configuration allow both different-RAT nodes to understand which assumptions were made for RRC comprehension.

FIG. 4 is a process flow diagram that summarizes some of the above aspects from the perspective of the master radio access node 20, which at block 402 sends to a secondary radio access node an addition request message comprising configuration information enabling the secondary radio access node to operate with the master node for dual connectivity with a user equipment (UE). In the above examples the addition request message comprising the configuration information was the message 1 comprising the SN-ConfigInfo shown at FIG. 2A and in more detail at FIGS. 2B and 3.

Then at block 404 the master radio access node receives from the secondary radio access node, in reply to the addition request message of block 402, a request acknowledgement message acknowledging participation by the secondary radio access node in the dual connectivity. In the above examples the request acknowledgement message was the message 2 of FIG. 2A that is shown in more detail at FIGS. 2B and 3. As block 404 further sets forth, a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control (RRC) signaling of the older RAT regardless which of the older and the newer RAT the master radio access node uses for the communicating.

Finally at FIG. 4 the master radio access node participates in the dual connectivity when communicating wirelessly with the UE. This assumes the connection that FIG. 2A shows being setup via the random access procedure becomes active between the secondary radio access node and the UE.

FIG. 5 is a process flow diagram that summarizes some of the above aspects from the perspective of the secondary radio access node 22, which at block 502 receives from a master radio access node an addition request message comprising configuration information enabling the secondary node to operate with the master node for dual connectivity with a UE. In the above examples the addition request message comprising the configuration information was the message 1 comprising the SN-ConfigInfo shown at FIG. 2A and in more detail at FIGS. 2B and 3.

Then at block 504 the secondary radio access node sends to the master radio access node, in reply to the addition request message, a request acknowledgement message acknowledging participation by the secondary radio access node in the dual connectivity. In the above examples the request acknowledgement message was the message 2 of FIG. 2A that is shown in more detail at FIGS. 2B and 3. As block 404 further sets forth, a) the dual connectivity comprises the master radio access node communicating wirelessly with the UE using one of an older or a newer radio access technology (RAT) and the secondary radio access node communicating wirelessly with the UE using the other of the older or the newer RAT; and b) the addition request message and the request acknowledgement message are in accordance with radio resource control signaling of the older RAT regardless which of the older and the newer RAT the secondary radio access node uses for the communicating.

Finally at block 506 the secondary radio access node establishes an active communication link with the UE for the dual connectivity, which FIG. 2A shows by example is via a random access procedure between the secondary radio access node and the UE. This connection establishment utilizes the secondary node configuration (SN-Config) that the secondary radio access node provides to the master in message 2 and which the master provides to the UE in the RRC connection reconfiguration message 3 shown at FIG. 2A.

The process flows at FIG. 4 and FIG. 5 are similar but from the perspective of the different master/secondary nodes 20, 22. In the examples above the older RAT of FIGS. 4-5 is E-UTRAN and the newer RAT is 5G, and further in those examples the request acknowledgement message 2 indicates a configuration of the secondary radio access node (SN-Config) for participating in the dual connectivity.

In some embodiments detailed above the addition request message of FIGS. 4-5 indicates an AS release version number that is valid for at least a portion of the configuration information (specifically, the version number that is valid for the MN-Config of FIG. 2B, and for the Ref-SN-Config of FIG. 3); and the request acknowledgement message 2 indicates an AS release version number that is valid for a configuration of the secondary radio access node (SN-Config) that is included in that same request acknowledgement message 2. More generally these AS release version numbers may be referred to respectively as a first and a second version number.

FIG. 2B above described an embodiment specific for the multi-RAT dual connectivity case in which the master radio access node is communicating with the UE using the older RAT (LTE) and the secondary radio access node is communicating with the UE using the newer RAT (NR/5G). In that specific example the configuration information in the addition request message 1 comprises a configuration of a master cell group (MN-Config) of which the master radio access node is a member, and capabilities of the UE (UE Capability) with regard to the newer RAT.

FIG. 3 above described an embodiment specific for the multi-RAT dual connectivity case in which the master radio access node is communicating with the UE using the newer RAT (NR/5G) and the secondary radio access node is communicating with the UE using the older RAT (LTE). In this specific example the configuration information in the addition request message 1 comprises a reference configuration for the secondary radio access node (Ref-SN-Config), and capabilities of the UE (SN-RAT capability) with regard to the older RAT.

Various of these aspects summarized above may be practiced individually or in any of various combinations within the overall framework of the processes shown at FIGS. 4-5. While the above description and FIGS. 4-5 are from the perspective of the network radio access nodes, the skilled artisan will recognize that these support corresponding behavior on the part of the UE also. The processes described and shown at FIGS. 4-5 may represent a method according to these teachings, or actions taken by an apparatus to implement these teachings, or actions performed in response to executing tangibly stored software that implements these teachings.

Figure 6:
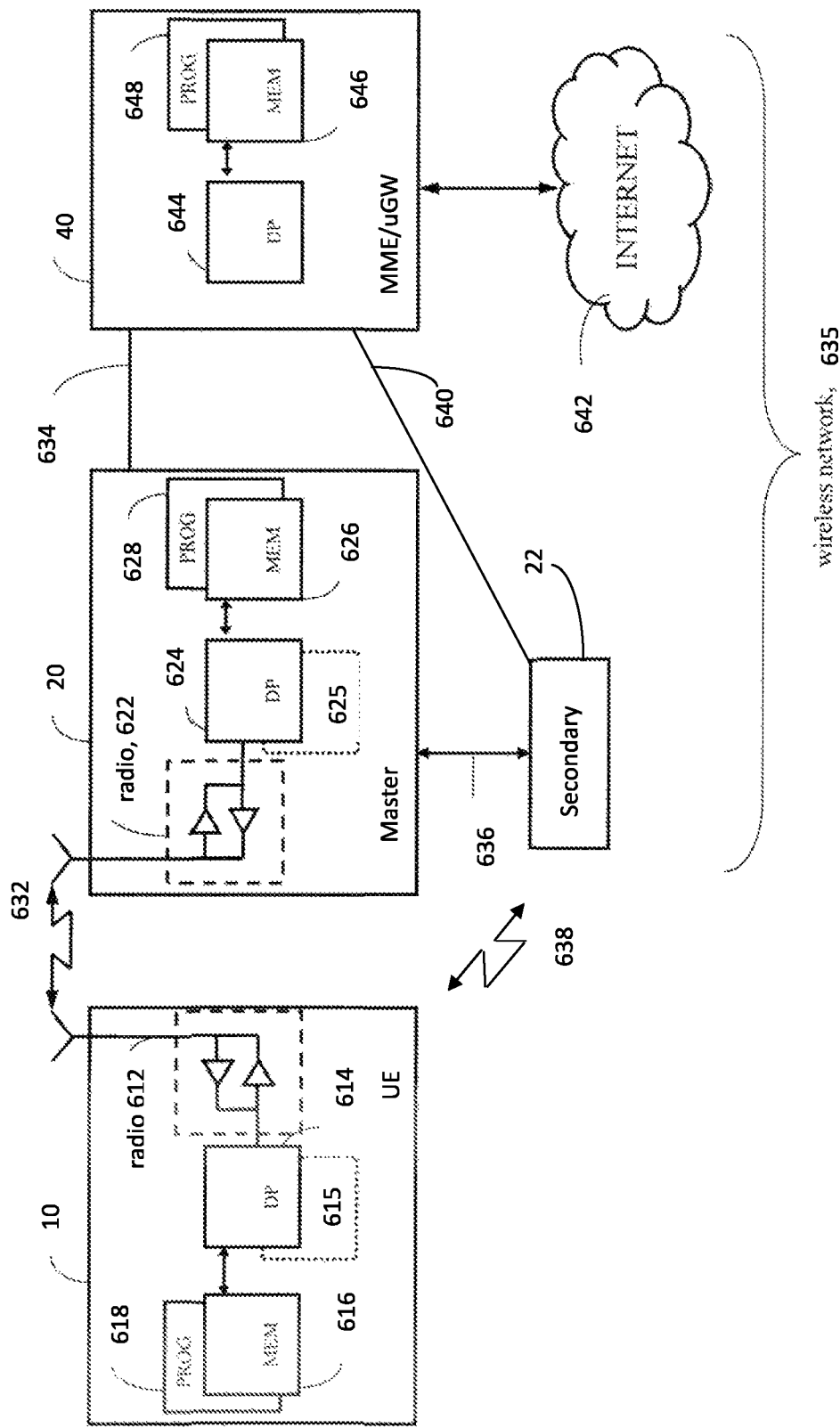
FIG. 6 is a high level schematic block diagram illustrating certain apparatus/devices that are suitable for practicing particular embodiments of these teachings.

FIG. 6 is a high level diagram illustrating some relevant components of various communication entities that may implement various portions of these teachings, including a base station identified generally as a master radio access node 20, a mobility management entity (MME) which may also be co-located with a user-plane gateway (uGW) 40 for the case in which the shared core network functions are LTE, and a user equipment (UE) 10. In the wireless system of FIG. 6 a communications network 635 is adapted for communication over a wireless link 632 with an apparatus, such as a mobile communication device which may be referred to as a UE 10, via a master radio access node 20. The network 635 may include a MME/Serving-GW 40 that provides connectivity with other and/or broader networks such as a publicly switched telephone network and/or a data communications network (e.g., the internet 638). When the core network is NR/5G the gateway function may be implemented differently and there may or may not be an MME 40.

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the master radio access node 20 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories. Also, only one radio 612 is shown in FIG. 6 for the UE 10 for clarity of illustration but in practice the UE 10 will have at least one radio for operating according to the older RAT and at least one radio for operating according to the newer RAT. Depending on the specific UE implementation there may be some hardware shared among these two radios, which may affect the UE capabilities for the multi-RAT dual connectivity.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The master radio access node 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The master radio access node 20 is coupled via a data/control path 634 to the MME 40. The path 634 may be implemented as an S1 interface. The radio network access node 20 may also be coupled to other radio access nodes such as the secondary radio access node 22 via data/control path 636, which may be implemented as an X2 or Xn interface. For purposes herein the secondary radio access node 22 is functionally similar to the master radio access node 20 and includes a DP, MEM, PROG, radio and antennas though it is operating on a different RAT with the UE for dual connectivity purposes, and so the secondary radio access node 22 is not detailed further.

The MME 640 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 and the PROG in the secondary radio access node 22 is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the master radio access node 20; and/or by the DP of the secondary radio access node 22; and/or by hardware, or by a combination of software and hardware (and firmware).

For the purposes of describing various exemplary embodiments in accordance with this invention the UE 10 and the radio network access node 20 may also include dedicated processors 615 and 625 respectively. The secondary radio access node 22 may also be implemented with one or more dedicated processors.

The computer readable MEMs 616, 626 and 646 and also the MEM in the secondary radio access node 22 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 as well as the DP in the secondary radio access node 22 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622, and the radio in the secondary radio access node 22) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

The following abbreviations that may be found in the specification and/or the drawing figures are defined as follows:
3GPP Third Generation Partnership Project
ASN.1 abstract syntax notation one
DC dual connectivity
EN-DC E-UTRA-NR/5G dual connectivity (LTE core network)
eNB evolved Node-B
E-UTRAN evolved UMTS radio access network
gNB next generation Node-B
LTE Long Term Evolution
MCG master cell group
MeNB master eNB
MgNB master gNB
MME mobility management entity
MN master node
MR-DC multi-RAT dual connectivity
NGEN-DC E-UTRA-NR/5G dual connectivity (NR/5G core network)
NR/5G new radio/5$^{th}$ generation cellular
RAT radio access technology
RAN radio access network
RRC radio resource control
SCG secondary cell group
SeNB secondary eNB
SgNB secondary gNB
SN secondary Node
UE user Equipment
UTRA UMTS Terrestrial Radio Access
UTRAN UMTS Terrestrial Radio Access Network
UMTS Universal Mobile Telecommunications Service

What is claimed is:
1. A method comprising:
sending from a master radio access node to a secondary radio access node an addition request message comprising configuration information enabling the secondary radio access node to operate with the master node for dual connectivity with a user equipment, wherein the addition request message indicates a first version number associated with the configuration information;
receiving at the master radio access node from the secondary radio access node, in reply to the addition request message, a request acknowledgement message acknowledging participation by the secondary radio access node in the dual connectivity, wherein the request acknowledgement message indicates a second version number associated with a configuration of the secondary radio access node;
determining, using the first version number and the second version number, dual connectivity coordination capabilities between the master radio access node and the secondary radio access node and a configuration of the user equipment for the dual connectivity, wherein the determining comprises that the secondary radio access node does not comprehend a newer version radio access technology for the dual connectivity; and thereafter
the master radio access node participating in the dual connectivity when communicating wirelessly with the user equipment,
wherein:
the dual connectivity comprises, based on the determining, the master radio access node communicating wirelessly with the user equipment using the newer version radio access technology and the secondary radio access node communicating wirelessly with the user equipment using an older version radio access technology, and
the addition request message and the request acknowledgement message are in accordance with radio resource control signaling of the older version radio access technology, wherein based at least on the determining using the first version number and the second version number the master radio access node is comprehending both the newer version radio access technology and the older version radio access technology for the communicating.

2. The method according to claim 1, wherein the older version radio access technology is E-UTRAN and the newer version radio access technology is 5G.

3. The method according to claim 1, wherein the request acknowledgement message indicates a configuration of the secondary radio access node for participating in the dual connectivity.

4. The method according to claim 1, wherein:
the first version number is valid for at least a portion of the configuration information; and
the first version number and the second version number are used to define which of the master radio access node or the secondary radio access node performs comprehending of both the newer version radio access technology and the older version radio access technology.

5. The method according to claim 1, wherein:
the dual connectivity comprises the master radio access node communicating with the user equipment using the older version radio access technology and the secondary radio access node communicating with the user equipment using the newer version radio access technology; and
the configuration information in the addition request message comprises a configuration of a master cell group of which the master radio access node is a member, and capabilities of the user equipment with regard to the newer version radio access technology.

6. The method according to claim 1, wherein:
the dual connectivity comprises the master radio access node communicating with the user equipment using the newer version radio access technology and the secondary radio access node communicating with the user equipment using the older version radio access technology; and
the configuration information in the addition request message comprises a reference configuration for the secondary radio access node, and capabilities of the user equipment with regard to the older version radio access technology.

7. A computer readable memory storing computer program instructions that, when executed by one or more processors, cause the master radio access node to perform the method according to claim 1.

8. An apparatus comprising:
at least one processor; and
at least one memory storing computer readable instructions that when executed by the at least one processor cause the apparatus to perform actions comprising:
sending from a master radio access node to a secondary radio access node an addition request message comprising configuration information enabling the secondary radio access node to operate with the master node for dual connectivity with a user equipment, wherein the addition request message indicates a first version number associated with the configuration information;
receiving at the master radio access node from the secondary radio access node, in reply to the addition request message, a request acknowledgement message acknowledging participation by the secondary radio access node in the dual connectivity, wherein the request acknowledgement message indicates a second version number associated with a configuration of the secondary radio access node;
determining, using the first version number and the second version number, dual connectivity coordination capabilities between the master radio access node and the secondary radio access node and a configuration of the user equipment for the dual connectivity, wherein the determining comprises that the secondary radio access node does not comprehend a newer version radio access technology for the dual connectivity; and thereafter:
the master radio access node participating in the dual connectivity when communicating wirelessly with the user equipment,
wherein:
the dual connectivity comprises, based on the determining, the master radio access node communicating wirelessly with the user equipment using one of an older version radio access technology or the newer version radio access technology and the secondary radio access node communicating wirelessly with the user equipment using the older version radio access technology; and
the addition request message and the request acknowledgement message are in accordance with radio resource control signaling of the older version radio access technology, wherein based at least on the determining, the first version number and the second version number of the radio access technology the master radio access node is comprehending both the newer version radio access technology and the older version radio access technology for the communicating.

9. The apparatus according to claim 8, wherein the older version radio access technology is E-UTRAN and the newer version radio access technology is 5G.

10. The apparatus according to claim 8, wherein the request acknowledgement message indicates a configuration of the secondary radio access node for participating in the dual connectivity.

11. The apparatus according to claim 8, wherein:
the first version number is valid for at least a portion of the configuration information; and
the first version number and the second version number are used to define which of the master radio access node or the secondary radio access node performs comprehending of both the newer version radio access technology and the older version radio access technology.

12. The apparatus according to claim 8, wherein:
the dual connectivity comprises the master radio access node communicating with the user equipment using the older version radio access technology and the secondary radio access node communicating with the user equipment using the newer version radio access technology; and
the configuration information in the addition request message comprises a configuration of a master cell group of which the master radio access node is a member, and capabilities of the user equipment with regard to the newer version radio access technology.

13. The apparatus according to claim 8, wherein:
the dual connectivity comprises the master radio access node communicating with the user equipment using the newer version radio access technology and the secondary radio access node communicating with the user equipment using the older version radio access technology; and
the configuration information in the addition request message comprises a reference configuration for the secondary radio access node, and capabilities of the user equipment with regard to the older version radio access technology.

14. The apparatus according to claim 8, wherein the apparatus is the master radio access node or a portion thereof.

15. A method comprising:
receiving at a secondary radio access node from a master radio access node an addition request message comprising configuration information enabling the secondary node to operate with the master node for dual connectivity with a user equipment, wherein the addition request message indicates a first version number associated with the configuration information;
sending from the secondary radio access node to the master radio access node, in reply to the addition request message, a request acknowledgement message acknowledging participation by the secondary radio access node in the dual connectivity, wherein the request acknowledgement message indicates a second version number associated with a configuration of the secondary radio access node, and wherein the first version number and the second version number are for use in determining dual connectivity coordination capabilities between the master radio access node and the secondary radio access node and a configuration of the user equipment for the dual connectivity, wherein the determining comprises that the secondary radio access node does not comprehend a newer version radio access technology for the dual connectivity; and thereafter the secondary radio access node establishing an active communication link with the user equipment for the dual connectivity, wherein:

the dual connectivity comprises, based on the determining, the master radio access node communicating wirelessly with the user equipment using one of an older version radio access technology or the newer version radio access technology and the secondary radio access node communicating wirelessly with the user equipment using the older version radio access technology; and the addition request message and the request acknowledgement message are in accordance with radio resource control signaling of the older version radio access technology wherein based at least on the determining, the first version number and the second version number version radio access technology the second radio access node is comprehending only the older version of the radio access technology for the communicating.

16. The method according to claim 15, wherein:
the older version radio access technology is E-UTRAN and the newer version radio access technology is 5G; and
the request acknowledgement message indicates a configuration of the secondary radio access node for participating in the dual connectivity.

17. The method according to claim 15, wherein:
the first version number is valid for at least a portion of the configuration information; and
the first version number and the second version number are for use to define which of the master radio access node or the secondary radio access node performs comprehending of both the newer version radio access technology and the older version radio access technology.

18. The method according to claim 15, wherein:
the dual connectivity comprises the master radio access node communicating with the user equipment using the older version radio access technology and the secondary radio access node communicating with the user equipment using the newer version radio access technology; and
the configuration information in the addition request message comprises a configuration of a master cell group of which the master radio access node is a member, and capabilities of the user equipment with regard to the newer version radio access technology.

19. The method according to claim 15, wherein:
the dual connectivity comprises the master radio access node communicating with the user equipment using the newer version radio access technology and the secondary radio access node communicating with the user equipment using the older version radio access technology; and the configuration information in the addition request message comprises a reference configuration for the secondary radio access node, and capabilities of the user equipment with regard to the older version radio access technology.

20. A computer readable memory storing computer program instructions that, when executed by one or more processors, cause the secondary radio access node to perform the method according to claim 15.

21. An apparatus comprising:
at least one processor; and
at least one memory storing computer readable instructions that when executed by the at least one processor cause the apparatus to perform actions comprising:
receiving at a secondary radio access node from a master radio access node an addition request message comprising configuration information enabling the secondary node to operate with the master node for dual connectivity with a user equipment, wherein the addition request message indicates a first version number associated with the configuration information;
sending from the secondary radio access node to the master radio access node, in reply to the addition request message, a request acknowledgement message acknowledging participation by the secondary radio access node in the dual connectivity, wherein the request acknowledgement message indicates a second version number associated with a configuration of the secondary radio access node, and wherein the first version number and the second version number are for use in determining dual connectivity coordination capabilities between the master radio access node and the secondary radio access node and a configuration o f the user equipment for the dual connectivity, wherein the determining comprises that the secondary radio access node does not comprehend a newer version radio access technology for the dual connectivity; and thereafter the secondary radio access node establishing an active communication link with the user equipment for the dual connectivity, wherein:

the dual connectivity comprises, based on the determining, the master radio access node communicating wirelessly with the user equipment using both an older version radio access technology or the newer version radio access technology (RAT) and the secondary radio access node communicating wirelessly with the user equipment using the older or the newer version radio access technology; and the addition request message and the request acknowledgement message are in accordance with radio resource control signaling of the older version radio access technology wherein based at least on the determining using the first version number and the second version number version radio access technology the second radio access node is comprehending only the older version of the radio access technology for the communicating.

22. The apparatus according to claim 21, wherein:
the older version radio access technology is E-UTRAN and the newer version radio access technology is 5G; and the request acknowledgement message indicates a configuration of the secondary radio access node for participating in the dual connectivity.

23. The apparatus according to claim 21, wherein:

the first version number is valid for at least a portion of the configuration information; and the first version number and the second version number are for use to define which of the master radio access node or the secondary radio access node performs comprehending of both the newer version radio access technology and the older version radio access technology.

24. The apparatus according to claim 21, wherein:

the dual connectivity comprises the master radio access node communicating with the user equipment using the older version radio access technology and the secondary radio access node communicating with the user equipment using the newer version radio access technology; and the configuration information in the addition request message comprises a configuration of a master cell group of which the master radio access node is a member, and capabilities of the user equipment with regard to the newer version radio access technology.

25. The apparatus according to claim 21, wherein:

the dual connectivity comprises the master radio access node communicating with the user equipment using the newer version radio access technology and the secondary radio access node communicating with the user equipment using the older version radio access technology; and the configuration information in the addition request message comprises a reference configuration for the secondary radio access node, and capabilities of the user equipment with regard to the older version radio access technology.

26. The apparatus according to claim 21, wherein the apparatus is the secondary radio access node or a portion thereof.

\* \* \* \* \*

UNITED STATES PATENT AND TRADEMARK OFFICE
CERTIFICATE OF CORRECTION

PATENT NO.        : 10,368,384 B2
APPLICATION NO.   : 15/672546
DATED             : July 30, 2019
INVENTOR(S)       : Amaanat Ali and Tero Henttonen Page 1 of 1

It is certified that error appears in the above-identified patent and that said Letters Patent is hereby corrected as shown below:

In the Claims

In Claim 21:
Column 18, Line 38, "o f" should be deleted and --of-- should be inserted.

Signed and Sealed this
Twenty-fourth Day of September, 2019

Andrei Iancu
*Director of the United States Patent and Trademark Office*